No. 827,049. PATENTED JULY 24, 1906.
E. J. VRAALSTAD.
GRAIN CONVEYER.
APPLICATION FILED NOV. 21, 1905.
2 SHEETS—SHEET 2.
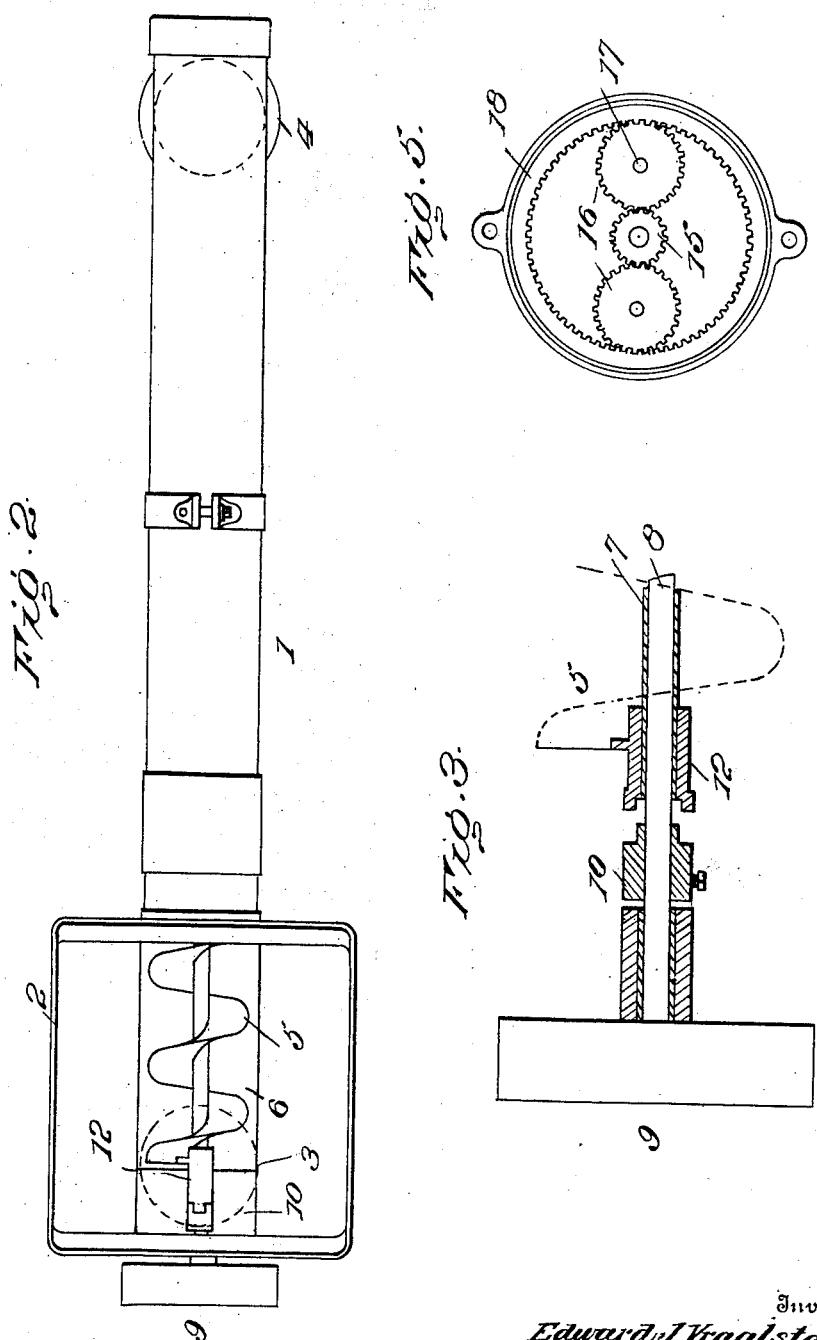
Inventor
Edward J. Vraalstad
Witnesses
By
Attorney

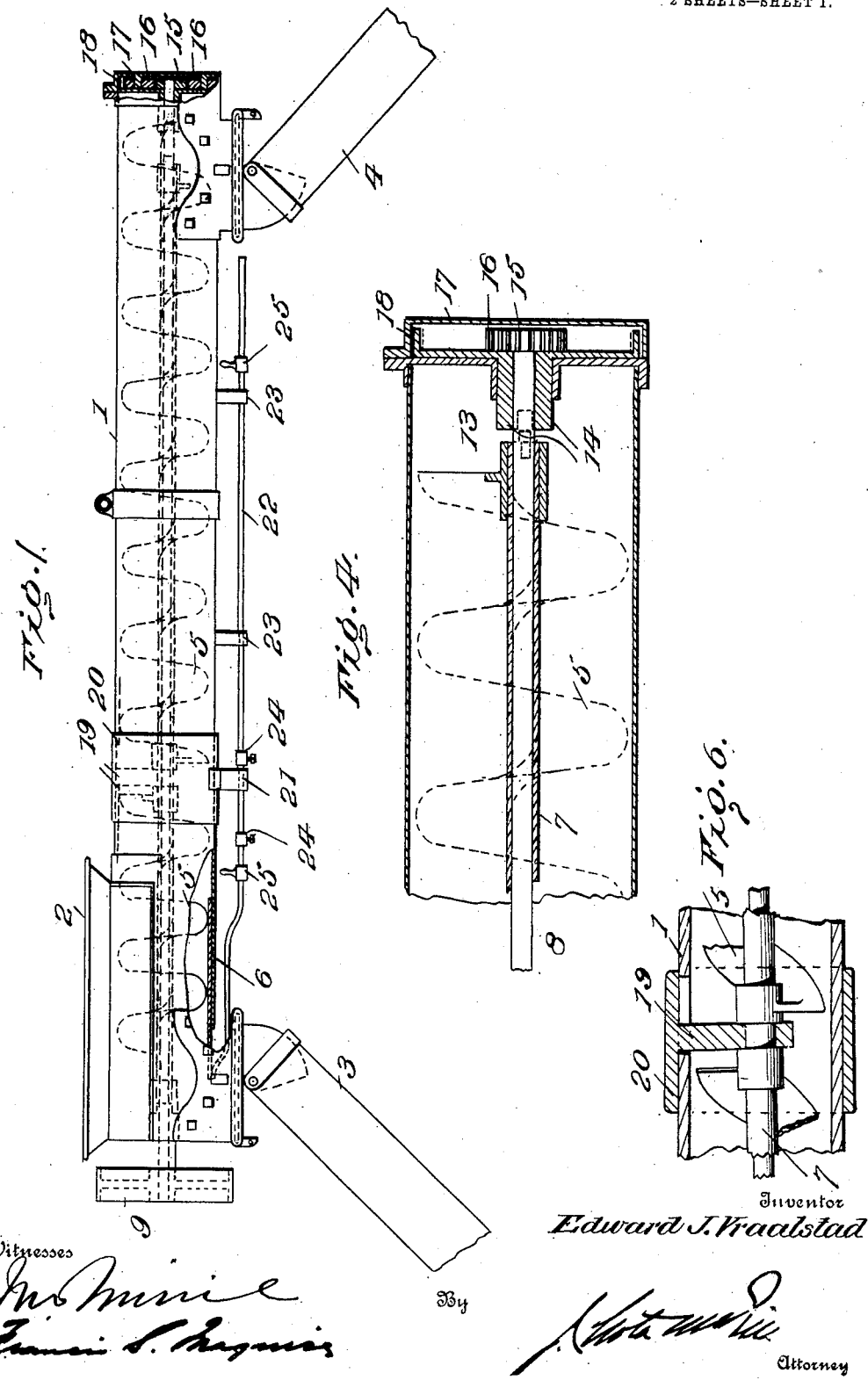

UNITED STATES PATENT OFFICE.

EDWARD J. VRAALSTAD, OF BUFFALO, NEW YORK, ASSIGNOR OF ONE-HALF TO BUFFALO PITTS COMPANY, OF BUFFALO, NEW YORK, A CORPORATION OF NEW YORK.

GRAIN-CONVEYER.

No. 827,049.     Specification of Letters Patent.     Patented July 24, 1906.

Application filed November 21, 1905. Serial No. 288,501.

*To all whom it may concern:*

Be it known that I, EDWARD J. VRAALSTAD, of Buffalo, in the county of Erie and State of New York, have invented certain new and useful Improvements in Grain-Conveyers; and I do hereby declare the following to be a full, clear, and exact description of the invention, such as will enable others skilled in the art to which it appertains to make and use the same.

The object of this invention is to provide a screw conveyer the direction of rotation of which may be readily reversed, although the operating-shaft revolves continuously in one direction, thereby enabling the discharge to be had at either of two points.

The invention will be hereinafter fully set forth, and particularly pointed out in the claims.

In the accompanying drawings, Figure 1 is a view in side elevation with parts in dotted lines and parts broken away. Fig. 2 is a plan view. Figs. 3 and 4 are enlarged sectional views of opposite ends of the conveyer. Fig. 5 is a face view of the transmission-gearing. Fig. 6 is a detail.

Referring to the drawings, 1 designates a cylindrical casing having at one end at the top a receiving-hopper 2. At both ends, opening from the bottom of this casing, are discharge delivery-chutes 3 and 4, the former being beneath the hopper, while the latter is at the far end of the casing.

5 designates a screw conveyer revoluble within casing 1, the direction of rotation controlling the direction of discharge of the grain—that is to say, whether it be through chute 3 or chute 4. If from chute 4, the outlet to chute 3 is closed by a valve 6 and all the grain is forced to the far end of the casing, while if the discharge is to be through chute 3 the direction of rotation of the conveyer is reversed and valve 6 is withdrawn. The shifting of the valve occurs simultaneously with the change of direction of rotation of the conveyer. The latter is equipped with an axial tubular spindle 7, slidably mounted on the operating-shaft 8, extended longitudinally through casing 1, such shaft having its bearings at the ends of the casing. This shaft is constantly rotated in one direction, the power being applied thereto at one end as to pulley 9. Upon this shaft is keyed a collar 10, with which a sleeve 12, secured to one end of spindle 7, is designed to engage when the screw is to revolve in the same direction as the operating-shaft. It will be understood that the collar 10 and sleeve 12 are equipped with interlocking portions, such as coacting slots and projections. At its other or outer end the spindle 7 likewise carries a sleeve 13 for interlocking with the hub or sleeve 14 of a transmission or reversing gearing, such interlocking being effected as the spindle is shifted to disengage it from collar 10. The shaft 8 is extended beyond the end of casing 1 and equipped with a small pinion 15, which meshes with two gear-wheels 16, arranged at opposite sides thereof, such gear-wheels having their bearings in an outer cap-plate 17, secured to the end plate of casing 1. These gear-wheels 16 mesh with an internally-toothed wheel 18, from which the hub or sleeve 14 extends. In this way the rotation of shaft 8 is communicated through the transmission-gearing to the screw conveyer, so that the latter may be rotated in the reverse direction to the shaft.

It is manifest that any suitable means may be employed for shifting the screw longitudinally of shaft 8. That shown consists of an arm 19, depending through casing 1 from a collar 20, slidably mounted on such casing, such arm being secured to spindle 7, forming thereby a slight interruption in the continuity of the screw, but not sufficient to interfere with the working thereof. This collar 20 is equipped with a depending lug 21, through which is passed a rod 22, mounted in brackets 23, likewise depending from the casing. Tappets 24 on this rod by contacting with lug 21 will effect the shifting of collar 20, and through it and arm 19 the shifting of the conveyer. This rod 22 is also secured to the valve 6, so that when the conveyer is shifted to cause it to revolve in the same direction as the operating-shaft and to thereby effect the discharge through chute 4 the valve will cut off communication with chute 3. Manipulating-handles 25 may be secured to rod 22 at suitable points.

It will be observed by reference to Figs. 1 and 2 that several convolutions of the screw are directly beneath the opening of the hopper into the conveyer-casing, while the outlet to chute 3 occupies but a small area of the space beneath such opening. In consequence when the conveyer is being actuated in the reverse direction—that is to say, to effect the discharge through chute 3—only those convolutions directly beneath or in close proximity to the opening of the hopper have any duty to perform; but when the discharge is through chute 4 and the outlet from chute 3 is closed all the convolutions of the screw are brought into play and the grain or other substance is caused to travel the full length of the casing to be discharged into the chute.

Although this conveyer has been especially designed for use in connection with threshing-machines, so as to thereby enable a continuous discharge to be maintained without having to reverse the operating-shaft, yet it is manifest that it may be used for other purposes, and although I have described a preferred means of embodiment the invention is not restricted in this respect.

I claim as my invention—

1. A conveyer comprising a shaft designed to be continuously operated in one direction, a screw conveyer concentric to and operated by said shaft, and means at or near each end of the screw for locking the latter to said shaft to cause it to revolve with, or in the reverse direction to, the shaft.

2. A conveyer comprising a shaft designed to be continuously operated in one direction, a screw conveyer concentric to, and operated by, said shaft, means for directly locking the conveyer to the shaft, and transmission or reversing mechanism operated by the shaft and with which the conveyer is designed to interlock when free of said locking means.

3. A conveyer comprising a casing having a single inlet and a plurality of outlets, a shaft designed to be constantly operated in one direction, a screw conveyer, means for directly locking the latter to the shaft, and means actuated by the shaft with which the conveyer is designed to interlock when not locked directly to the shaft, said conveyer being caused to revolve with, or in the reverse direction to, the shaft to effect the discharge into the different outlets.

4. The combination with the casing and the shaft continuously operated in one direction, of the screw conveyer having a tubular spindle concentric to said shaft, and means intermediate the shaft and the spindle for causing the conveyer to revolve with, or in the reverse direction to, the shaft.

5. The combination with the casing and the shaft continuously operated in one direction, of the screw conveyer having a tubular spindle concentric to said shaft, means for shifting said spindle longitudinally of the shaft, means at one end of the spindle for directly interlocking with the shaft, and transmission or reversing mechanism operated by said shaft with which said spindle at its other end is designed to interlock.

6. The combination with the casing having a hopper at one end and outlets at its two ends, one outlet being beneath said hopper, of a screw-conveyer extended longitudinally of the casing, an operating-shaft, means for causing said conveyer to revolve with, or in the reverse direction to, the shaft, and means for closing off communication to the outlet beneath the hopper when the conveyer is rotating with the shaft.

7. The combination with the casing having a hopper at one end and outlets at its two ends, one outlet being beneath said hopper, of a screw conveyer extended longitudinally of the casing, an operating-shaft extended longitudinally through the conveyer and designed to revolve continuously in one direction, a collar on said shaft with which said spindle is designed to interlock, transmission or reversing mechanism actuated by said shaft and having a collar with which said spindle is designed to interlock when shifted in one direction, means for shifting the spindle, and a valve actuated by such shifting means for controlling the outlet beneath the hopper.

8. The combination with the casing and the shaft continuously operated in one direction having a gear-pinion on one end, of the screw conveyer having a tubular spindle through which said shaft extends, an internally toothed wheel at one end of the casing concentric to said shaft, gear-wheels intermediate said pinion and said internally-toothed wheel, means for causing said conveyer to engage with said internally-toothed wheel, and means for locking said screw conveyer to said shaft when the same is disengaged from said wheel.

9. The combination with the casing having an inlet-hopper at one end and outlets at its opposite ends, of a screw conveyer located within said casing, means for operating said screw conveyer in either direction, such means comprising a shaft concentric to said screw conveyer, means for positively locking the latter to said shaft, transmission or reversing mechanism actuated by said shaft and with which said screw conveyer is designed to engage when not locked to the shaft, means extending outside of the casing and connected to said screw conveyer for effecting the shifting thereof, and means operated by the last-mentioned means for cutting off one of said outlets.

In testimony whereof I have signed this specification in the presence of two subscribing witnesses.

EDWARD J. VRAALSTAD.

Witnesses:
H. P. SEIPP,
JOHN B. OLMSTED.